(12) United States Patent
Pai et al.

(10) Patent No.: US 6,564,573 B2
(45) Date of Patent: May 20, 2003

(54) CONCENTRATED AMMONIA AQUEOUS SOLUTION TANK USED IN ABSORPTION DIFFUSION TYPE REFRIGERATING EQUIPMENT

(75) Inventors: Hao Pai, Hsintien (TW); Ru He Jan, Hsintien (JP); Chin Hung Kuo, Hsintien (TW)

(73) Assignee: Heat Energy Advanced Technology Corp., Taipei Hsien (TW)

( * ) Notice: Subject to any disclaimer, the term of this patent is extended or adjusted under 35 U.S.C. 154(b) by 0 days.

(21) Appl. No.: 10/143,937

(22) Filed: May 14, 2002

(65) Prior Publication Data

US 2002/0170310 A1 Nov. 21, 2002

(30) Foreign Application Priority Data

May 18, 2001 (TW) .......................................... 90112042

(51) Int. Cl.$^7$ ................................................ F25B 15/00
(52) U.S. Cl. ...................... 62/487; 62/484; 62/494; 62/470; 62/84; 62/468; 62/498
(58) Field of Search .......................... 62/484, 494, 470, 62/84, 468, 498, 487

(56) References Cited

U.S. PATENT DOCUMENTS

| | | | | |
|---|---|---|---|---|
| 4,724,679 A | * | 2/1988 | Rademacher | 62/101 |
| 5,531,080 A | * | 7/1996 | Hirahara et al. | 62/470 |
| 5,548,971 A | * | 8/1996 | Rockenfeller et al. | 62/324.2 |
| 5,598,721 A | * | 2/1997 | Rockerfeller et al. | 62/480 |
| RE36,684 E | * | 5/2000 | Rockenfeller et al. | 62/324.2 |
| 6,126,723 A | * | 10/2000 | Drost et al. | 96/4 |
| 6,170,270 B1 | * | 1/2001 | Arhansky et al. | 62/81 |

* cited by examiner

*Primary Examiner*—William C. Doerrler
*Assistant Examiner*—Mark S. Shulman
(74) *Attorney, Agent, or Firm*—Rosenberg, Klein & Lee

(57) ABSTRACT

The present invention proposes a concentrated ammonia aqueous solution tank used in an absorption diffusion type refrigerating equipment. The present invention is characterized in that a capillary tissue is placed in the concentrated ammonia aqueous solution tank. The capillary tissue is formed by bending knitted metal nets or is integrally formed by means of sintering. Thereby, additional surface area of absorption reaction can be increased, and the volume and weight of the original absorber can be reduced, hence increasing refrigerating speed and reducing refrigerating temperature.

2 Claims, 4 Drawing Sheets

CONCENTRATED AMMONIA AQUEOUS SOLUTION TANK USED IN ABSORPTION DIFFUSION TYPE REFRIGERATING EQUIPMENT

FIELD OF THE INVENTION

The present invention relates to a concentrated ammonia aqueous solution tank used in an absorption diffusion type refrigerating equipment and, more particularly, to an improved concentrated ammonia aqueous solution tank with a capillary tissue placed therein for increasing additional absorption reaction.

BACKGROUND OF THE INVENTION

Generally speaking, ammonia absorption type refrigerating circulation and ammonia compression type refrigerating circulation are different in their ways of accomplishing compression. In the absorption type refrigerating circulation, after low-pressure ammonia vapor is absorbed by water, a hydraulic pump is used to pump this aqueous solution to a high-pressure site. FIG. 1 shows the action flowchart of the ammonia absorption type refrigerating circulation, wherein after low-pressure ammonia vapor leaves an evaporator and then enters an absorber, it is absorbed by diluted ammonia aqueous solution therein. Because this process proceeds at a temperature slightly higher than ambient temperature, there must be heat transferred to the exterior.

The obtained concentrated ammonia aqueous solution is pumped via a heat exchanger to a generator kept at a high pressure and a high temperature. Thereby, through the help of the conducted-in heat of a high-temperature heat source in the generator, ammonia vapor will be evaporated from the concentrated ammonia aqueous solution, flow to a condenser to condense into liquid ammonia, and then enter the evaporator. Additionally, the diluted ammonia aqueous solution generated in the generator passes through the heat exchanger and then flows back to the absorber, hence accomplishing an absorption type refrigerating circulation.

Moreover, in the absorption type refrigerating circulation, the function of the absorber is to absorb the ammonia vapor flowing out from the evaporator by diluted ammonia aqueous solution to form concentrated ammonia aqueous solution for repetitive use. Because this process is a chemical absorption reaction, more time is required to achieve more complete absorption. A winding pipe is generally designed to provide a longer-time absorption reaction. However, because of the lengthy winding pipe, the absorber will have a substantial volume and weight. Therefore, the prior art has inconvenience and drawbacks in practical use. The present invention aims to solve the above problems.

SUMMARY OF THE INVENTION

One object of the present invention is to provide a concentrated ammonia aqueous solution tank used in an absorption diffusion type refrigerating equipment. The present invention is characterized in that a capillary tissue is placed in the concentrated ammonia aqueous solution tank to increase the surface area of absorption reaction and effectively reduce the volume and weight of the original absorber simultaneously, hence increasing refrigerating speed and reducing refrigerating temperature.

The various objects and advantages of the present invention will be more readily understood from the following detailed description when read in conjunction with the appended drawing, in which:

DETAILED DESCRIPTION OF THE PREFERRED EMBODIMENTS

Figure 1:
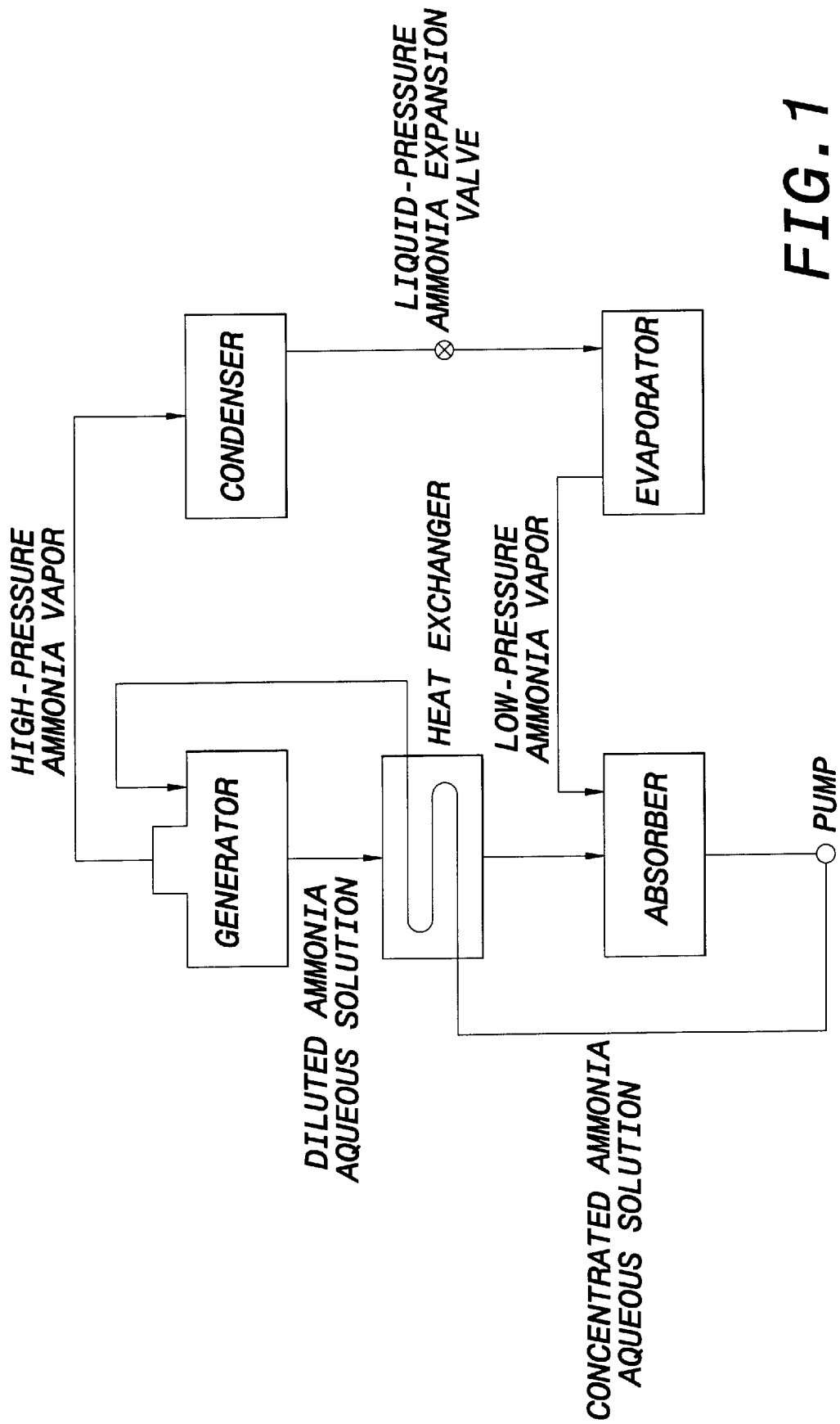
FIG. 1 is an action flowchart of a prior art ammonia absorption type refrigerating circulation.
Figure 2:
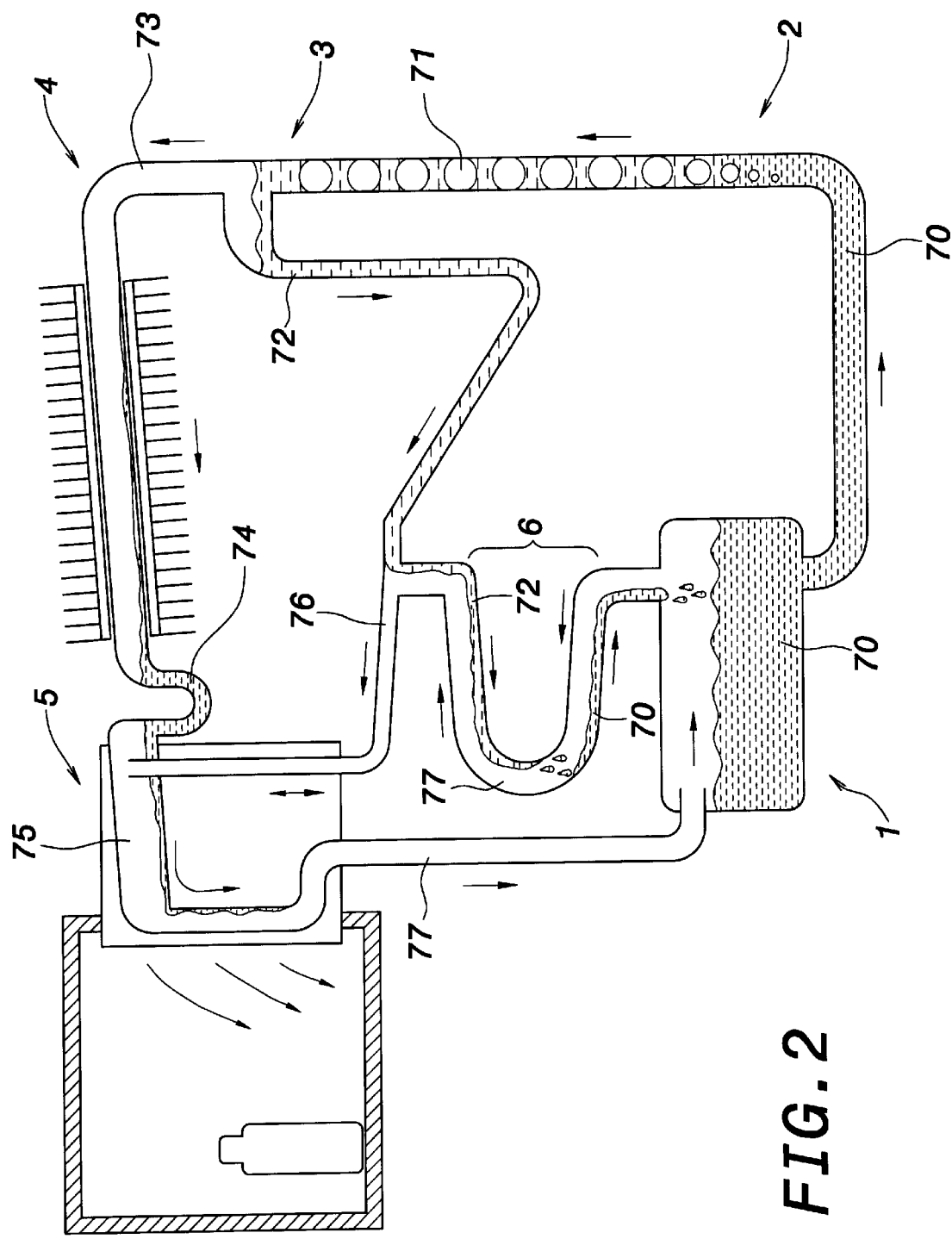
FIG. 2 is an action flowchart of an absorption diffusion type refrigerating circulation of the present invention.

The present invention provides a concentrated ammonia aqueous solution tank used in an absorption diffusion type refrigerating equipment, wherein the absorption diffusion type refrigerating equipment (shown in FIG. 2) comprises a concentrated ammonia aqueous solution tank 1, a generator 2, a vapor and liquid separated device 3, a condenser 4, an evaporator 5, an absorber 6, and required pipelines and control devices (not shown).

The refrigerating equipment uses ammonia as the refrigerant, and ammonia can be divided into concentrated ammonia aqueous solution and diluted (weak)ammonia aqueous solution according to the concentration thereof. The refrigerating action of the refrigerating equipment is illustrated below. First, concentrated ammonia aqueous solution 70 flowing out from the concentrated ammonia aqueous solution tank 1 passes through the generator 2 and is heated. Along with the increase of temperature, the concentrated ammonia aqueous solution 70 begins to evaporate and generate bubbles 71 to separate out diluted (weak)ammonia aqueous solution 72 and ammonia vapor 73. The ammonia vapor 73 enters the condenser 4 and condenses to form liquid ammonia 74. The liquid ammonia 74 then enters the evaporator 5 to be evaporated into ammonia vapor 75. The ammonia vapor 75 is mixed with hydrogen gas 76 flowing out from the absorber 6 to form mixed ammonia vapor and hydrogen gas 77, which flows back to the concentrated ammonia aqueous solution tank 1.

The diluted ammonia aqueous solution 72 separated by the generator 2 enters the absorber 6 and then performs mutual absorption reaction with the mixed ammonia vapor and hydrogen gas 77 passing through the absorber 6 so that the diluted ammonia aqueous solution 72 is absorbed to gradually become the concentrated ammonia aqueous solution 70, which then flows back to the concentrated ammonia aqueous solution tank 1. The mixed ammonia vapor and hydrogen gas 77 passing through the absorber 6 is also absorbed to gradually become the hydrogen gas 76, which then enters the evaporator 5. The action flowchart of an absorption diffusion type refrigerating circulation is thus accomplished.

Figure 3:
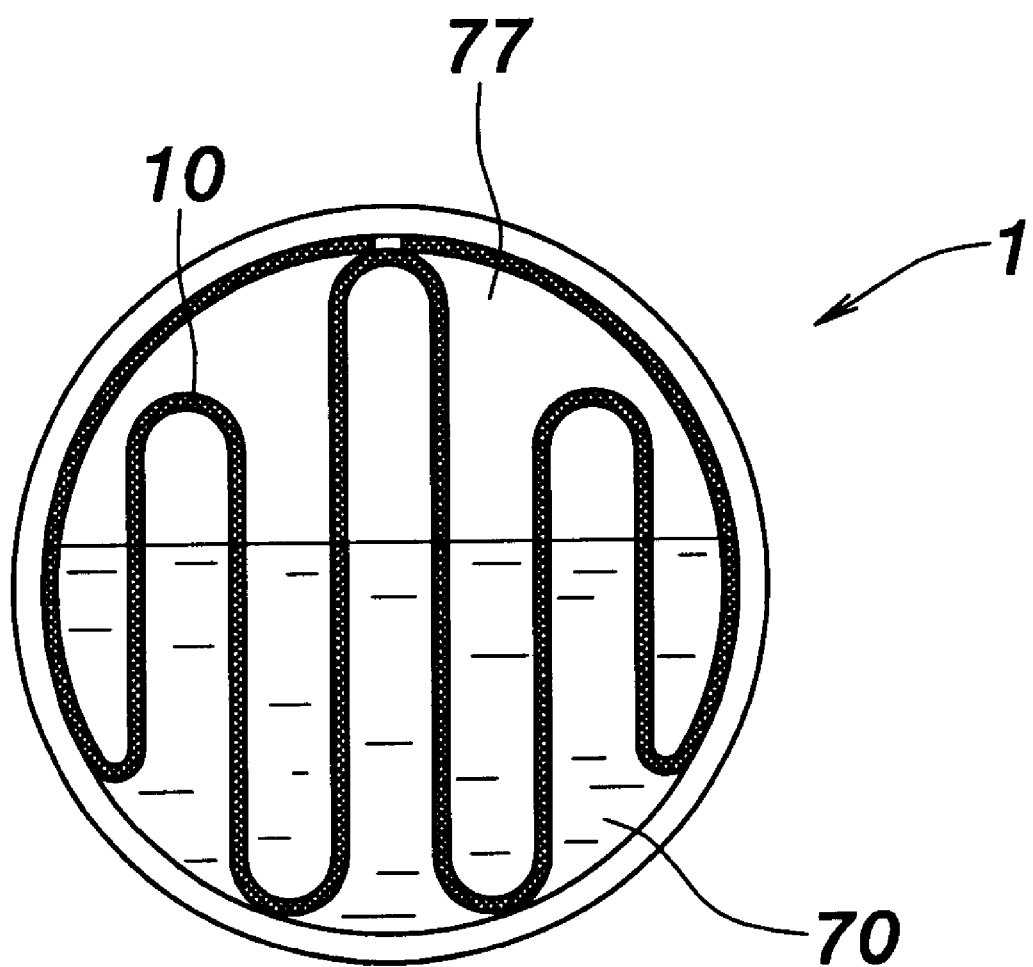
FIG. 3 is a cross-sectional view of a concentrated ammonia aqueous solution tank used in an absorption diffusion type refrigerating equipment of the present invention.
Figure 4:
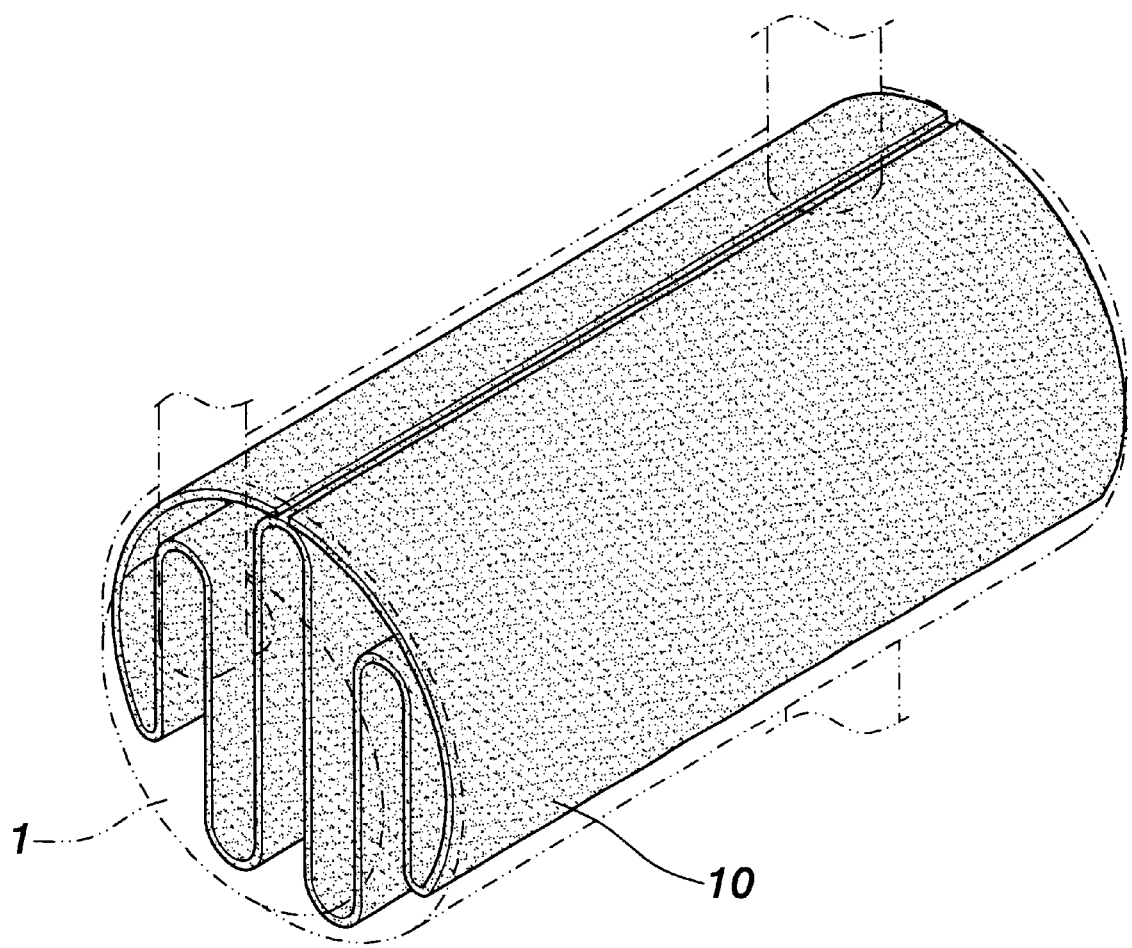
FIG. 4 is a perspective view of a capillary tissue of the present invention.

The design of the present invention is aimed at the concentrated ammonia aqueous solution tank 1 of the absorption diffusion type refrigerating equipment. Please refer to FIGS. 3 and 4 simultaneously. A capillary tissue 10 is placed in the concentrated ammonia aqueous solution tank 1 immersed in the concentrated ammonia aqueous solution 70, part of the capillary tissue 10 protrudes out of the liquid face. The capillary tissue 10 is formed by bending knitted metal nets or by winding fiber bundles, or is formed of sintered powder, foaming metal, and porous ceramic. The capillary tissue 10 is used to increase the surface area of absorption reaction and reduce the volume and weight of the original absorber so as to increase refrigerating speed and reduce refrigerating temperature.

To sum up, the present invention is characterized in that a capillary tissue is placed in a concentrated ammonia aqueous solution tank to enhance absorption reaction.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A concentrated ammonia aqueous solution tank used in an absorption diffusion type refrigerating equipment, said concentrated ammonia aqueous solution tank is characterized in that a capillary tissue is placed in the concentrated ammonia aqueous solution tank immersed in the concentrated ammonia aqueous solution, part of the capillary tissue protrudes out of the liquid face, said capillary tissue being used to increase the surface area of absorption reaction and reduce the volume and weight of the original absorber, hence increasing refrigerating speed and reducing refrigerating temperature.

2. The concentrated ammonia aqueous solution tank used in an absorption diffusion type refrigerating equipment as claimed in claim 1, wherein said capillary tissue is formed by bending knitted nets or by winding fiber bundles, or is formed of sintered powder, foaming metal, and porous ceramic.

* * * * *